US012391110B2

(12) United States Patent
Tottori et al.

(10) Patent No.: US 12,391,110 B2
(45) Date of Patent: Aug. 19, 2025

(54) AIRFLOW ARRANGEMENT FOR COOLING AN ELECTRIC WORK VEHICLE

(71) Applicant: Kubota Corporation, Osaka (JP)

(72) Inventors: Norita Tottori, Sakai (JP); Hironobu Nogami, Sakai (JP); Daisuke Miyazaki, Sakai (JP); Renta Kasai, Sakai (JP); Daisuke Nakayama, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/768,286

(22) Filed: Jul. 10, 2024

(65) Prior Publication Data

US 2024/0359549 A1 Oct. 31, 2024

Related U.S. Application Data

(63) Continuation of application No. 17/619,524, filed as application No. PCT/JP2020/020873 on May 27, 2020, now Pat. No. 12,070,995.

(30) Foreign Application Priority Data

Jun. 24, 2019 (JP) ................ 2019-116723

(51) Int. Cl.
*B60K 1/04* (2019.01)
*B60K 11/04* (2006.01)
(Continued)

(52) U.S. Cl.
CPC ............... *B60K 1/04* (2013.01); *B60K 11/04* (2013.01); *B60L 1/00* (2013.01); *B60L 50/60* (2019.02);
(Continued)

(58) Field of Classification Search
CPC .... B60K 1/04; B60K 11/04; B60K 2001/003; B60K 2001/0411; B60L 1/00;
(Continued)

(56) References Cited

U.S. PATENT DOCUMENTS

2005/0111167 A1  5/2005 Yamaguchi et al.
2018/0118014 A1* 5/2018 Wantschik ............... B60K 1/00
2019/0075724 A1* 3/2019 Becke .................. A01D 34/006

FOREIGN PATENT DOCUMENTS

JP  2005178732 A  7/2005

OTHER PUBLICATIONS

Tottori et al., "Cooling Arrangement for Electric Work Vehicle", U.S. Appl. No. 17/619,524, filed Dec. 15, 2021.
(Continued)

*Primary Examiner* — Jason D Shanske
*Assistant Examiner* — James J Triggs
(74) *Attorney, Agent, or Firm* — Keating & Bennett, LLP

(57) ABSTRACT

An electric work vehicle includes a travel battery, an auxiliary battery, a motor drivable on electric power supplied by the travel battery, a travel device drivable by the motor, a voltage converter positioned forward of the travel battery to step down a voltage of electric power from the travel battery and supply the electric power to the auxiliary battery, and a radiator positioned forward of the travel battery, wherein the voltage converter and the radiator are laterally next to each other in a plan view.

9 Claims, 8 Drawing Sheets

(51) Int. Cl.
*B60L 1/00* (2006.01)
*B60L 50/60* (2019.01)
*B62D 25/08* (2006.01)
*B62D 25/10* (2006.01)
*B60K 1/00* (2006.01)
*B62D 49/06* (2006.01)

(52) U.S. Cl.
CPC ............ *B62D 25/084* (2013.01); *B62D 25/10* (2013.01); *B60K 2001/003* (2013.01); *B60K 2001/0411* (2013.01); *B60L 2200/40* (2013.01); *B62D 49/06* (2013.01)

(58) Field of Classification Search
CPC ................. B60L 50/60; B60L 2200/40; B62D 25/084; B62D 25/10; B62D 49/06
See application file for complete search history.

(56) References Cited

OTHER PUBLICATIONS

Official Communication issued in corresponding Chinese Patent Application No. 202080036387.X, mailed on Oct. 11, 2024, 7 pages.

\* cited by examiner

AIRFLOW ARRANGEMENT FOR COOLING AN ELECTRIC WORK VEHICLE

BACKGROUND OF THE INVENTION

1. Field of the Invention

The present invention relates to an electric work vehicle including a travel battery, a motor drivable on electric power supplied by the travel battery, and a travel device drivable by the motor.

2. Description of the Related Art

JP2018-69926A discloses a work vehicle ("tractor" in JP2018-69926A) including an engine and a travel device drivable by the engine ("front wheels" and "rear wheels" in JP2018-69926A).

SUMMARY OF THE INVENTION

The work vehicle disclosed in JP2018-69926A may be modified by replacing the engine with a battery and a motor. This will allow the work vehicle to travel without discharging exhaust gas.

The work vehicle disclosed in JP2018-69926A may also be modified by including a cooling water path through various devices and a radiator to cool cooling water. This will allow various devices to be cooled.

The work vehicle disclosed in JP2018-69926A may also be modified by including an auxiliary battery and a voltage converter for stepping down the voltage of electric power from the travel battery and supplying the resulting electric power to the auxiliary battery. This will allow electric power to be supplied to the auxiliary battery.

The arrangement of the voltage converter and the radiator can make it impossible to suitably cool both the voltage converter and the radiator, or can make it troublesome to maintain the voltage converter and the radiator.

If, for instance, the voltage converter is positioned forward of the radiator, the voltage converter will block cooling air supplied from an area positioned forward of the radiator toward the radiator as the work vehicle travels. As a result, while the voltage converter will be cooled effectively, the radiator will not. In other words, this arrangement will make it impossible to effectively cool both the voltage converter and the radiator.

If, for instance, the voltage converter is positioned backward of the travel battery, and the radiator is positioned forward of the travel battery, the voltage converter and the radiator will be far apart from each other with the travel battery therebetween. This will likely make it difficult to maintain the voltage converter and the radiator at the same time, making the maintenance work troublesome.

Preferred embodiments of the present invention provide electric work vehicles each including a voltage converter and a radiator both of which can be cooled effectively and maintained easily.

A preferred embodiment of the present invention includes a travel battery, an auxiliary battery, a motor drivable on electric power supplied by the travel battery, a travel device drivable by the motor, a voltage converter positioned forward of the travel battery to step down a voltage of electric power from the travel battery and supply the electric power to the auxiliary battery, and a radiator positioned forward of the travel battery, wherein the voltage converter and the radiator are laterally next to each other in a plan view.

A preferred embodiment of the present invention includes a voltage converter and a radiator that are laterally next to each other in a plan view. This allows cooling air to be supplied to the voltage converter and the radiator similarly as the work vehicle travels. The above configuration, in other words, prevents cooling air flowing toward one of the voltage converter and the radiator from being blocked by the other.

As a result, the above configuration makes it possible to effectively cool both the voltage converter and the radiator.

In addition, with a preferred embodiment of the present invention, the voltage converter and the radiator are both positioned forward of the travel battery. This allows the voltage converter and the radiator to be maintained at the same time, making the maintenance work easy.

A preferred embodiment of the present invention therefore allows production of an electric work vehicle including a voltage converter and a radiator, both of which can be cooled effectively and maintained easily.

A preferred embodiment of the present invention may preferably be further structured such that the radiator, the voltage converter, and the auxiliary battery are laterally next to one another in a plan view.

The above configuration allows cooling air to be supplied to the radiator, the voltage converter, and the auxiliary battery similarly as the work vehicle travels, making it easy to cool all of the radiator, the voltage converter, and the auxiliary battery effectively.

In addition, with the above configuration, the radiator, the voltage converter, and the auxiliary battery are all positioned forward of the travel battery. This allows the radiator, the voltage converter, and the auxiliary battery to be maintained at the same time, making the maintenance work easy.

A preferred embodiment of the present invention may preferably further include a reserve tank for the radiator, wherein the radiator, the voltage converter, and the reserve tank are laterally next to one another in a plan view.

The above configuration allows cooling air to be supplied to the radiator, the voltage converter, and the reserve tank similarly as the work vehicle travels, making it easy to cool all of the radiator, the voltage converter, and the reserve tank effectively.

In addition, with the above configuration, the radiator, the voltage converter, and the reserve tank are all positioned forward of the travel battery. This allows the radiator, the voltage converter, and the reserve tank to be maintained at the same time, making the maintenance work easy.

A preferred embodiment of the present invention may preferably be further structured such that the reserve tank and the auxiliary battery are arranged in an up-down direction of a machine body.

The above configuration allows cooling air to be supplied to the radiator, the voltage converter, the reserve tank, and the auxiliary battery similarly as the work vehicle travels, making it easy to cool all of the radiator, the voltage converter, the reserve tank, and the auxiliary battery effectively.

In addition, with the above configuration, the radiator, the voltage converter, the reserve tank, and the auxiliary battery are all positioned forward of the travel battery. This allows the radiator, the voltage converter, the reserve tank, and the auxiliary battery to be maintained at the same time, making the maintenance work easy.

In addition, the above configuration uses only a small space in terms of the left-right direction of the machine body for the reserve tank and the auxiliary battery as compared to a case of a reserve tank and an auxiliary battery being laterally next to each other in a plan view. The machine body, as a result, likely has an advantageously small width.

A preferred embodiment of the present invention may preferably further include a radiator frame with an angular arch shape surrounding the radiator and holding the radiator in place, wherein the voltage converter is attached to the radiator frame and oriented to have a longitudinal direction extending in an up-down direction of a machine body.

The above configuration uses only a small space in terms of the left-right direction of the machine body for the voltage converter as compared to a case of a voltage converter being oriented to have a longitudinal direction extending in the left-right direction of the machine body. The machine body, as a result, likely has an advantageously small width.

In addition, the above configuration allows the voltage converter to be held in place by the radiator frame. The above configuration thus eliminates the need to include a dedicated member for holding the voltage converter in place, and thus reduces the production cost as compared to a case of including a dedicated member for holding the voltage converter in place.

A preferred embodiment of the present invention may preferably further include a cooling water hose connected to the radiator, a cover capable of being opened and closed and of accommodating the voltage converter, the radiator, the cooling water hose, and the radiator frame, a support extending upward from an upper portion of the radiator frame, and a cover support coupled to an upper end portion of the support and capable of supporting the cover in an open state, wherein the support includes a first portion extending upward from the upper portion of the radiator frame, a second portion extending forward from a middle portion of the first portion in the up-down direction of the machine body, and a third portion extending downward from a front end portion of the second portion and connected to the upper portion of the radiator frame, and the cooling water hose extends through an area defined by the first portion, the second portion, and the third portion.

With the above configuration, the support is connected to an upper portion of the radiator frame at the first portion and the third portion. This allows the support to be supported stably by the radiator frame as compared to a case of only either of a first portion and a third portion of the support being connected to an upper portion of a radiator frame.

In addition, the above configuration allows the area defined by the first portion, the second portion, and the third portion to be utilized as a space for the cooling water hose. This allows the electric work vehicle to be compact.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

The description below describes preferred embodiments of the present invention with reference to drawings. The description below uses terms such as "front" and "forward" to refer to the direction indicated with arrow F in FIGS. 1 to 3, 6, and 7, terms such as "back" and "backward" to refer to the direction indicated with arrow B in the same drawings, terms such as "left" and "leftward" to refer to the direction indicated with arrow L in FIGS. 3, 4, and 6, terms such as "right" and "rightward" to refer to the direction indicated with arrow R in the same drawings, terms such as "above" and "upward" to refer to the direction indicated with arrow U in FIGS. 1, 2, and 4, and terms such as "below" and "downward" to refer to the direction indicated with arrow D in the same drawings.

Figure 1:
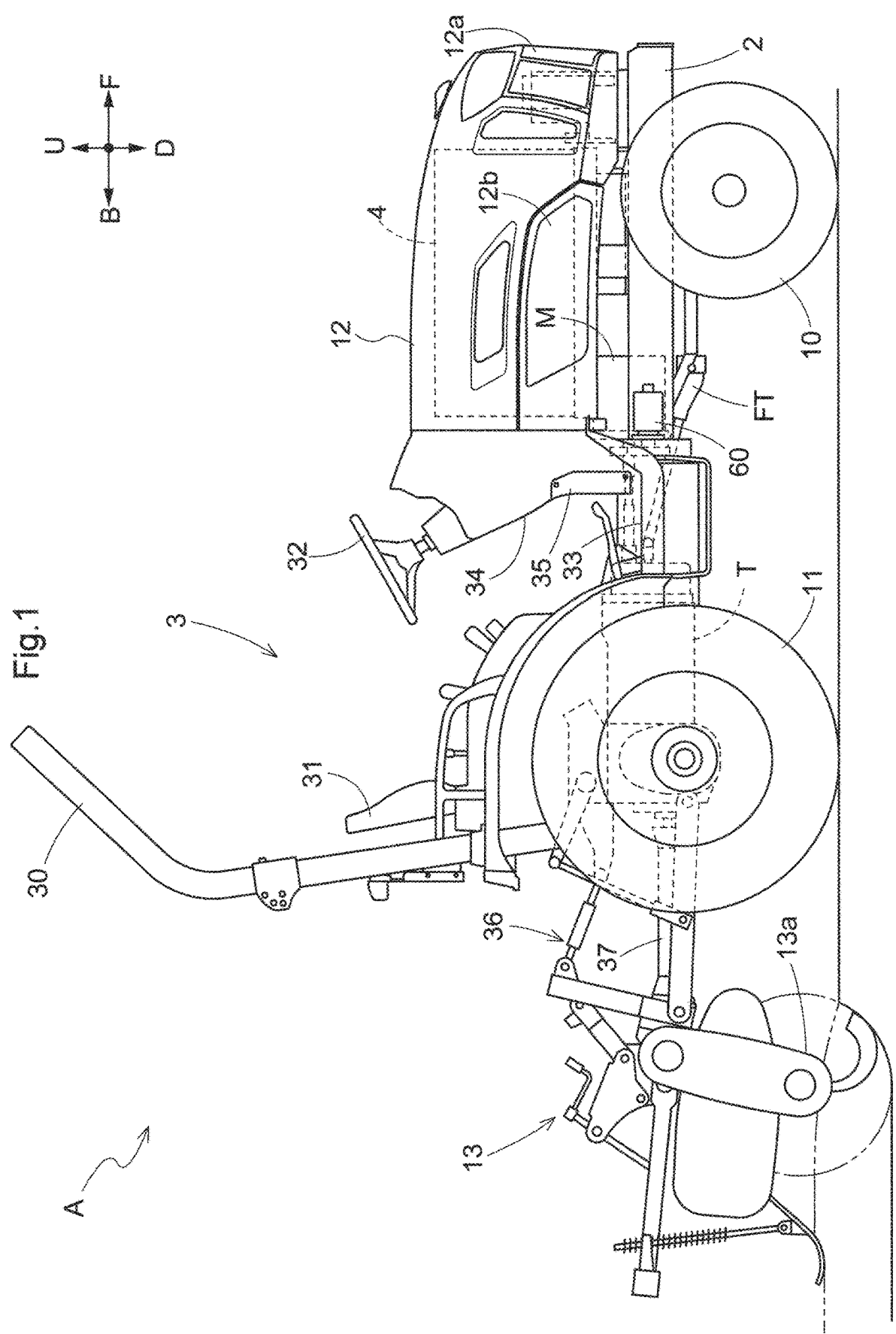
FIG. 1 is a right side view of a tractor.

FIG. 1 illustrates a tractor A (as an example of the "electric work vehicle" of the present invention) including left and right front wheels 10 (as an example of the "travel device" for the present invention), left and right rear wheels 11 (as an example of the "travel device" for the present invention), a cover member 12, and a tiller device 13.

The tractor A further includes a body frame 2 and a driver section 3.

The body frame 2 is supported by the left and right front wheels 10 and the left and right rear wheels 11. The tiller device 13 is supported by a back portion of the body frame 2.

The cover member 12 is at a front portion of the machine body. The driver section 3 is behind the cover member 12.

The driver section 3 includes a protection frame 30, a driver's seat 31, a steering wheel 32, and a floor 33. An operator can sit on the driver's seat 31 and perform various drive operations in the driver section 3.

Operating the steering wheel 32 changes the direction of the left and right front wheels 10. The operator can place their feet on the floor 33 when sitting on the driver's seat 31.

The tractor A, in other words, includes a driver section 3 including a driver's seat 31 on which an operator is able to sit.

The tractor A further includes a travel battery 4, a motor M, a transmission device T, and a front transmission mechanism FT.

The cover member 12 is swingable about an open/close axis Q (see FIG. 2) extending in the left-right direction of the machine body. This allows the cover member 12 to be opened and closed. The cover member 12, when in the closed state, accommodates the travel battery 4. The travel battery 4 supplies electric power to the motor M.

The motor M is under the travel battery 4. The motor M is driven on electric power supplied by the travel battery 4, and transmits its driving force to the transmission device T.

The transmission device T is positioned backward of the travel battery 4 and behind the motor M. The front transmission mechanism FT extends forward from the transmission device T. The transmission device T varies the driving force received from the motor M, and transmits the resulting driving force to the left and right rear wheels 11 as well as to the left and right front wheels 10 via the front transmission mechanism FT. This drives the left and right front wheels 10 and the left and right rear wheels 11.

The tractor A, in other words, includes a motor M positioned under the travel battery 4 and drivable on electric power supplied by the travel battery 4. The tractor A also includes left and right front wheels 10 and left and right rear wheels 11 drivable by the motor M.

The transmission device T transmits a portion of the driving force received from the motor M to the tiller device 13. This drives the tiller device 13.

The above configuration allows the tractor A to travel with use of the left and right front wheels 10 and the left and right rear wheels 11 and simultaneously perform tillage work with use of the tiller device 13.

Figure 2:
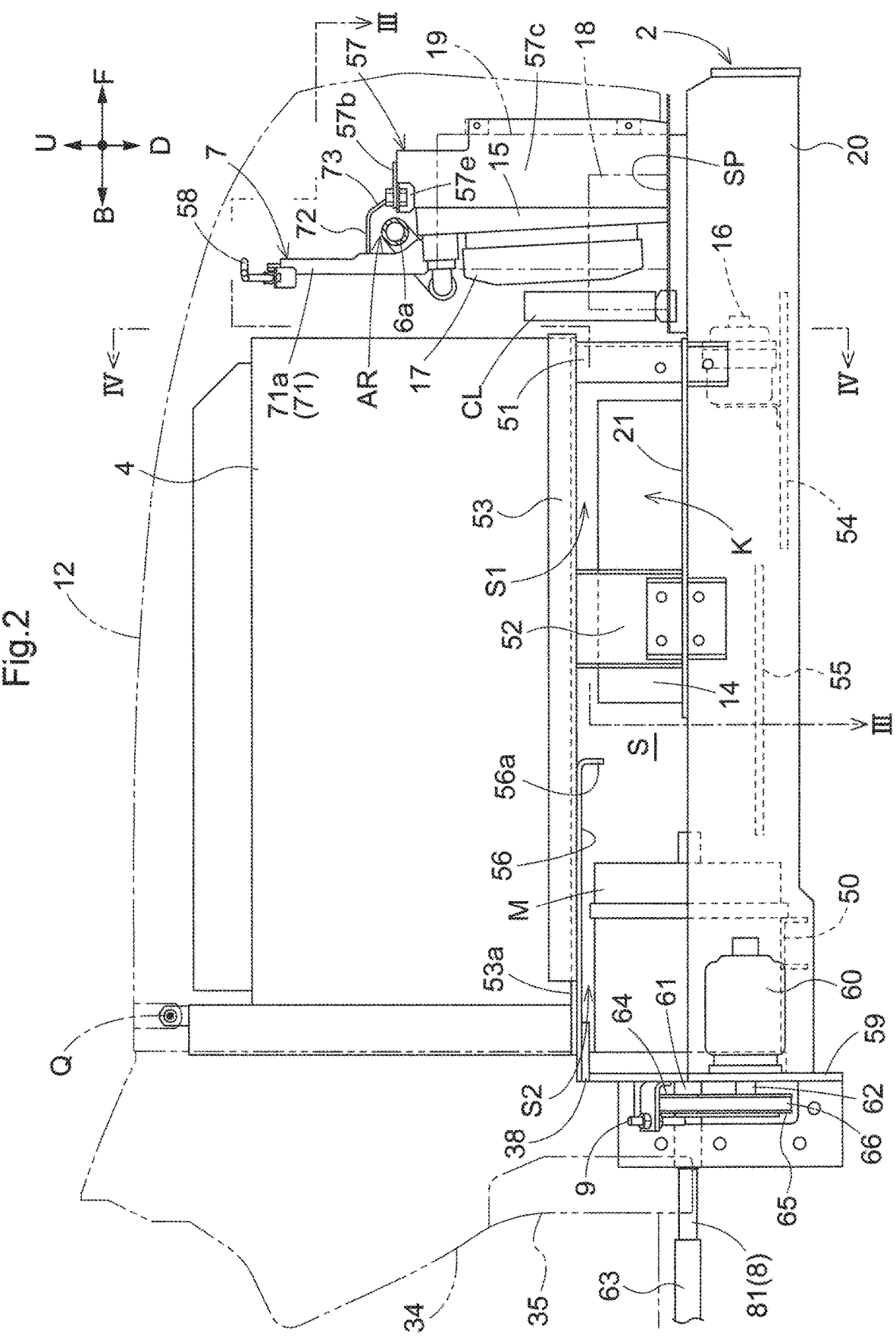
FIG. 2 is a right side view of a travel battery and elements therearound.
Figure 3:
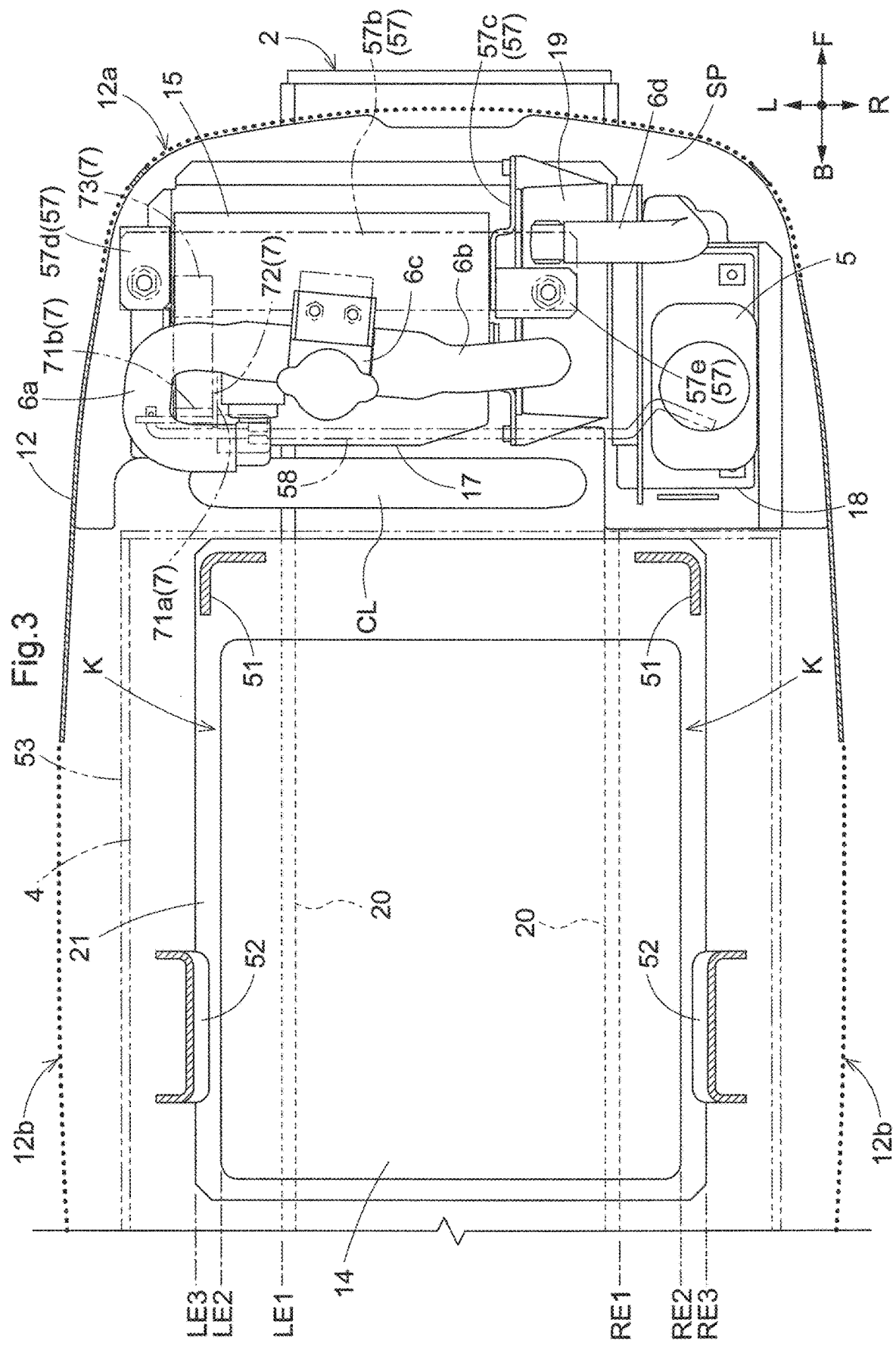
FIG. 3 is a cross-sectional view of the tractor taken along line III-III in FIG. 2.
Figure 4:
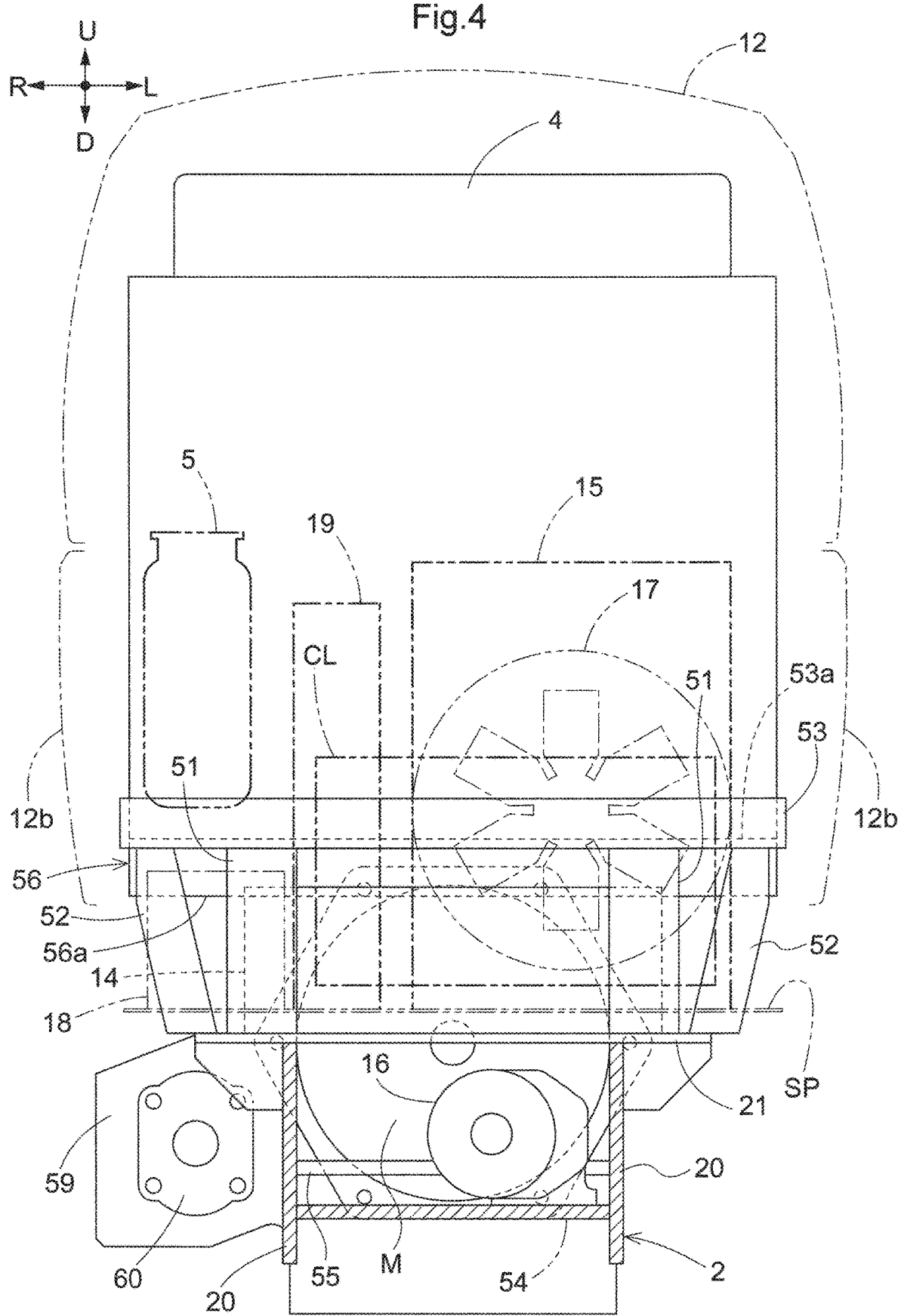
FIG. 4 is a cross-sectional view of the tractor taken along line IV-IV in FIG. 2.

As illustrated in FIGS. 2 to 4, the travel battery 4 is above the body frame 2. The body frame 2 and the travel battery 4 define a ventilation space S therebetween.

The tractor A, in other words, includes a travel battery 4 above the body frame 2.

The ventilation space S is capable of letting air through.

The tractor A further includes an inverter 14 under the travel battery 4 and forward of the motor M.

The inverter 14 converts direct-current electric power from the travel battery 4 into alternating-current electric power, and supplies the alternating-current electric power to the motor M.

The tractor A, in other words, includes an inverter 14 positioned under the travel battery 4 and forward of the motor M and configured to convert direct-current electric power from the travel battery 4 into alternating-current electric power and supply the alternating-current electric power to the motor M.

The motor M and the inverter 14 are arranged in the front-back direction of the machine body.

The inverter 14 and the travel battery 4 define a first space S1 therebetween. The first space S1 is part of the ventilation space S, and is thus capable of letting air through.

The motor M and the travel battery 4 define a second space S2 therebetween. The second space S2 is part of the ventilation space S, and is thus capable of letting air through.

The motor M is positioned in contact with the ventilation space S.

The motor M is, in other words, in contact with the ventilation space S.

The body frame 2 includes left and right main frames 20 and an inverter support 21. The left and right main frames 20 extend in the front-back direction of the machine body.

The tractor A, in other words, includes a left main frame 20 and a right main frame 20 both extending in the front-back direction of the machine body.

The motor M is between the left and right main frames 20.

The inverter support 21 extends over the left and right main frames 20, and is supported thereby. The inverter support 21 supports the inverter 14.

The inverter 14 is, in other words, supported by the left main frame 20 and the right main frame 20 with the inverter support 21 therebetween.

FIG. 3 shows a first left-end position LE1, a second left-end position LE2, and a third left-end position LE3. The first left-end position LE1 coincides with the left end of the left main frame 20. The second left-end position LE2 coincides with the left end of the inverter 14. The third left-end position LE3 coincides with the left end of the inverter support 21.

As illustrated in FIG. 3, the second left-end position LE2 is leftward of the first left-end position LE1. In other words, the inverter 14 extends farther leftward than the left end of the left main frame 20.

The third left-end position LE3 is leftward of the first left-end position LE1 and the second left-end position LE2. In other words, the inverter support 21 extends farther leftward than the left end of the left main frame 20.

FIG. 3 also shows a first right-end position RE1, a second right-end position RE2, and a third right-end position RE3. The first right-end position RE1 coincides with the right end of the right main frame 20. The second right-end position RE2 coincides with the right end of the inverter 14. The third right-end position RE3 coincides with the right end of the inverter support 21.

As illustrated in FIG. 3, the second right-end position RE2 is rightward of the first right-end position RE1. In other words, the inverter 14 extends farther rightward than the right end of the right main frame 20.

The third right-end position RE3 is rightward of the first right-end position RE1 and the second right-end position RE2. In other words, the inverter support 21 extends farther rightward than the right end of the right main frame 20.

The inverter 14, in other words, extends farther leftward than the left end of the left main frame 20 and farther rightward than the right end of the right main frame 20.

The inverter support 21 also extends farther leftward than the left end of the left main frame 20 and farther rightward than the right end of the right main frame 20.

As illustrated in FIGS. 2 to 4, the tractor A includes left and right first support frames 51, left and right second support frames 52, and a battery support 53.

The left and right first support frames 51 are forward of the left and right second support frames 52. The left and right first support frames 51 and the left and right second support frames 52 all stand on the inverter support 21.

The left and right first support frames 51 and the left and right second support frames 52, in other words, all stand on the body frame 2.

The tractor A further includes a plate-shaped support 38 and a plate-shaped partition member 56 (described later) between the motor M and the travel battery 4. The plate-shaped support 38 and the plate-shaped partition member 56 are each oriented horizontally. The plate-shaped partition member 56 is over the plate-shaped support 38.

The tractor A further includes a back portion support frame 59 supported by the body frame 2. The back portion support frame 59 supports a back end portion of the battery support 53 with the plate-shaped support 38 and the plate-shaped partition member 56 therebetween.

The battery support 53 is above the body frame 2, and is supported by the left and right first support frames 51, the left and right second support frames 52, and the back portion support frame 59. The battery support 53 supports the travel battery 4.

The tractor A, in other words, includes a battery support 53 positioned above the body frame 2 and supporting the travel battery 4.

With the above configuration, the travel battery 4 is supported by the inverter support 21 with the battery support 53, the left and right first support frames 51, and the left and right second support frames 52 therebetween.

The travel battery 4 is, in other words, supported by the inverter support 21 with the left and right first support frames 51 therebetween, which stand on the inverter support 21. In addition, the travel battery 4 is supported by the inverter support 21 with the left and right second support frames 52 therebetween, which stand on the inverter support 21.

The tractor A has a left ventilation opening K defined by the body frame 2, the battery support 53, the left first support frame 51, and the left second support frame 52.

The tractor A also has a right ventilation opening K defined by the body frame 2, the battery support 53, the right first support frame 51, and the right second support frame 52.

The left and right ventilation openings K each communicate with the ventilation space S.

In other words, the ventilation space S communicates with the left and right ventilation openings K.

As illustrated in FIG. 2, the battery support 53 includes a bottom plate 53a. The bottom plate 53a is oriented horizontally, and defines and functions as a partition between the travel battery 4 and the inverter 14.

The tractor A, in other words, includes a bottom plate 53a as a partition between the travel battery 4 and the inverter 14.

As illustrated in FIGS. 2 and 4, the tractor A includes a first plate-shaped member 54 and a second plate-shaped member 55.

The first plate-shaped member 54 and the second plate-shaped member 55 each extend from one of the left and right main frames 20 to the other. The first plate-shaped member 54 is forward of the second plate-shaped member 55. The first plate-shaped member 54 and the second plate-shaped member 55 are each held in position by the left and right main frames 20.

In other words, the body frame 2 holds the first plate-shaped member 54 and the second plate-shaped member 55 in position.

The first plate-shaped member 54 and the second plate-shaped member 55 are below the ventilation space S, and are oriented horizontally.

As illustrated in FIGS. 1 and 3, the cover member 12 includes an inlet section 12a. The inlet section 12a is capable of letting outside air into the cover member 12. The inlet section 12a is at a front end portion of the cover member 12.

The inlet section 12a for the present preferred embodiment is in the form of a plurality of small holes. The present invention is, however, not limited to such an arrangement. The inlet section 12a may alternatively be in any other form. The inlet section 12a may, for instance, be in the form of a single hole, or include a blower to let outside air in.

The cover member 12 includes left and right outlet sections 12b. The left and right outlet sections 12b are each capable of letting air out of the cover member 12.

The cover member 12, in other words, includes left and right outlet sections 12b each capable of letting air out of the cover member 12.

The left outlet section 12b is at a left side portion of the cover member 12, whereas the right outlet section 12b is at a right side portion of the cover member 12.

The left outlet section 12b is leftward of the travel battery 4. The right outlet section 12b is rightward of the travel battery 4. The left and right outlet sections 12b are, in other words, each lateral to the travel battery 4.

The left and right outlet sections 12b for the present preferred embodiment are each in the form of a plurality of small holes. The present invention is, however, not limited to such an arrangement. The left and right outlet sections 12b may each alternatively be in any other form. The left and right outlet sections 12b may each, for instance, be in the form of a single hole, or include a blower to let air out.

As illustrated in FIGS. 2 to 4, the tractor A includes a radiator 15 and a water pump 16. The radiator 15 is forward of the travel battery 4.

The tractor A, in other words, includes a radiator 15 forward of the travel battery 4.

The radiator 15 and the water pump 16 are included in a cooling water path of the tractor A. The water pump 16 forces cooling water to circulate through the cooling water path. The cooling water is cooled by the radiator 15 as it passes therethrough.

The tractor A, in other words, includes a water pump 16 to force cooling water to pass through a radiator 15.

The water pump 16 is forward of the motor M and below the inverter 14. The water pump 16 is supported by the first plate-shaped member 54.

The tractor A further includes a cooling fan 17. The cooling fan 17 is in front of the travel battery 4. The cooling fan 17 is, in other words, forward of the travel battery 4.

When the cover member 12 is in the closed state, the radiator 15 and the cooling fan 17 are accommodated in the cover member 12.

The tractor A, in other words, includes a cover member 12 capable of accommodating the cooling fan 17 and the travel battery 4.

The cooling fan 17 extends in the up-down direction of the machine body to face both the travel battery 4 and the ventilation space S. The cooling fan 17 also extends in the up-down direction of the machine body to face both the travel battery 4 and the inverter 14.

The cooling fan 17 blows cooling air backward. This causes outside air to enter the cover member 12 through the inlet section 12a and pass through the radiator 15, thus cooling the radiator 15.

The cooling fan 17 is, in other words, forward of the travel battery 4, and cools the radiator 15.

The cooling fan 17 sends cooling air to a front portion of the travel battery 4 and to the ventilation space S.

The tractor A, in other words, includes a cooling fan 17 positioned forward of the travel battery 4 and configured to send cooling air to the travel battery 4.

The cooling fan 17 sends cooling air to a front portion of the travel battery 4, at least a portion of which cooling air flows to a space leftward of the travel battery 4 and to a space rightward of the travel battery 4 to be let out through the left and right outlet sections 12b. This cools the front portion and lateral side portions of the travel battery 4.

The cooling fan 17 sends cooling air to the ventilation space S, a portion of which cooling air reaches the first space S1 and then passes through the left and right ventilation openings K and the left and right outlet sections 12b to be let out of the cover member 12.

This cools a lower portion of the travel battery 4 and the inverter 14.

Another portion of the cooling air, which the cooling fan 17 sends to the ventilation space S, reaches the first space S1 and then continues to flow through the ventilation space S to pass through the second space S2.

This cools a lower portion of the travel battery 4, the inverter 14, and the motor M.

As illustrated in FIG. 2, the tractor A includes a horizontally oriented plate-shaped partition member 56 between the battery support 53 and the motor M.

The plate-shaped partition member 56 includes a wind guide plate 56a. The wind guide plate 56a is a front end portion of the plate-shaped partition member 56 which is bent downward. The wind guide plate 56a is thus oriented vertically, and faces toward the cooling fan 17.

The tractor A, in other words, includes a wind guide plate 56a facing toward the cooling fan 17.

The wind guide plate 56a is under the travel battery 4 and forward of the second space S2.

This allows that portion of the cooling air through the ventilation space S which flows toward the second space S2 to be guided by the wind guide plate 56a to downward thereof. This in turn allows more cooling air to flow toward the motor M, thus cooling the motor M with cooling air effectively.

Figure 5:
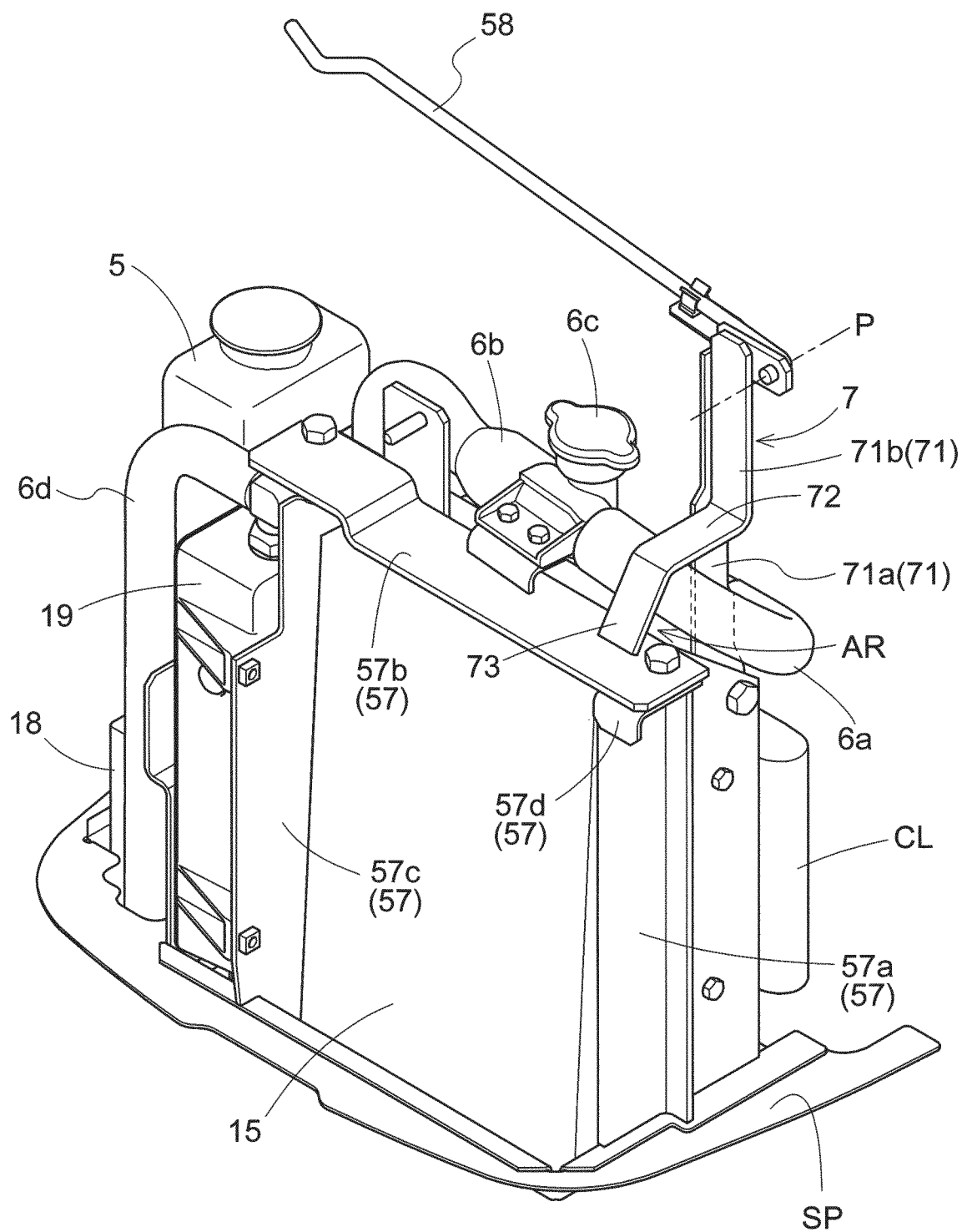
FIG. 5 is a perspective view of a radiator and elements therearound.

As illustrated in FIGS. 3 to 5, the tractor A includes a reserve tank 5 for the radiator 15. The reserve tank 5 stores cooling water. The reserve tank 5 is forward of the travel battery 4 and rightward of the radiator 15.

As illustrated in FIGS. 2 to 5, the tractor A includes an auxiliary battery 18 and a voltage converter 19. The auxiliary battery 18 supplies electric power to various auxiliaries such as the cooling fan 17.

The travel battery 4 transmits electric power to the voltage converter 19, which then steps down the voltage of the electric power and supplies the resulting electric power to the auxiliary battery 18.

The tractor A, in other words, includes a voltage converter 19 positioned forward of the travel battery 4 and configured to step down the voltage of electric power from the travel battery 4 and supply the resulting electric power to the auxiliary battery 18.

The auxiliary battery 18 and the voltage converter 19 are forward of the travel battery 4 and rightward of the radiator 15. The voltage converter 19 is oriented to have a longitudinal direction extending in the up-down direction of the machine body.

As illustrated in FIG. 3, the voltage converter 19 and the radiator 15 are laterally next to each other in a plan view. The radiator 15, the voltage converter 19, and the auxiliary battery 18 are laterally next to one another in a plan view.

The voltage converter 19 is between the radiator 15 and the auxiliary battery 18 in a plan view.

The radiator 15, the voltage converter 19, and the reserve tank 5 are laterally next to one another in a plan view.

The voltage converter 19 is between the radiator 15 and the reserve tank 5 in a plan view.

As illustrated in FIGS. 3 and 4, the reserve tank 5 extends over the auxiliary battery 18. The reserve tank 5 and the auxiliary battery 18 are arranged in the up-down direction of the machine body.

As illustrated in FIGS. 2 and 3, the tractor A includes a cooler CL. The cooler CL cools an operating fluid of the tractor A as it passes through the cooler CL.

As illustrated in FIGS. 2, 3, and 5, the radiator 15 is held in place by a radiator frame 57 in the shape of an angular arch. The radiator frame 57 surrounds the radiator 15.

The tractor A, in other words, includes a radiator frame 57 with an angular arch shape surrounding the radiator 15 and holding the radiator 15 in place.

The radiator frame 57 includes a left side plate 57a, a top plate 57b, a right side plate 57c, a first top plate support 57d, and a second top plate support 57e.

The left side plate 57a is a left portion of the radiator frame 57. The top plate 57b is a top portion of the radiator frame 57. The right side plate 57c is a right portion of the radiator frame 57.

The left side plate 57a and the right side plate 57c are each oriented vertically, and are arranged in the left-right direction. The left side plate 57a and the right side plate 57c face each other.

The first top plate support 57d extends leftward from an upper end portion of the left side plate 57a. The second top plate support 57e extends rightward from an upper end portion of the right side plate 57c. The top plate 57b is placed on and supported by the upper surface of the first top plate support 57d and the upper surface of the second top plate support 57e.

The voltage converter 19 is attached to the radiator frame 57. Specifically, the voltage converter 19 is attached to the right surface of the right side plate 57c.

The tractor A includes a first hose 6a (as an example of the "cooling water hose" for the present invention), a second hose 6b, a water supply section 6c, and a third hose 6d, which are included in the cooling water path of the tractor A.

The first hose 6a has a first end connected to the radiator 15 and a second end connected to the water supply section 6c.

The tractor A, in other words, includes a first hose 6a connected to the radiator 15.

The second hose 6b has a first end connected to the water supply section 6c and a second end connected to the voltage converter 19.

The third hose 6d is connected to the voltage converter 19.

An operator can supply cooling water into the water supply section 6c. The cooling water flows sequentially through the third hose 6d, the voltage converter 19, the second hose 6b, the water supply section 6c, the first hose 6a, and the radiator 15.

As illustrated in FIGS. 2, 3, and 5, the tractor A includes a support 7 and a cover support 58. The support 7 is supported by the radiator frame 57, and extends upward from an upper portion of the radiator frame 57.

The tractor A, in other words, includes a support 7 extending upward from an upper portion of the radiator frame 57.

The cover support 58 is in the shape of a bar. The cover support 58 includes a first end portion coupled to an upper end portion of the support 7 in such a manner as to be swingable in the up-down direction about a swing axis P extending in the front-back direction of the machine body.

When the cover member 12 is in the open state, swinging the cover support 58 upward to a standing position allows its second end portion to come into contact with an inner wall surface of the cover member 12. With the second end portion of the cover support 58 in contact with the inner wall surface of the cover member 12, the cover member 12 is supported by the cover support 58.

The above configuration allows the cover support 58 to support the cover member 12 in the open state.

The tractor A, in other words, includes a cover support 58 coupled to an upper end portion of the support 7 and capable of supporting the cover member 12 in the open state.

The cover member 12, in the closed state, accommodates the voltage converter 19, the first hose 6a, the radiator frame 57, the reserve tank 5, and the auxiliary battery 18.

The tractor A, in other words, includes a cover member 12 capable of being opened and closed and of accommodating the voltage converter 19, the radiator 15, the first hose 6a, and the radiator frame 57.

The support 7 includes a first portion 71, a second portion 72, and a third portion 73.

The first portion 71 extends upward from an upper portion of the radiator frame 57. The first portion 71 includes a lower end portion connected to the upper portion of the radiator frame 57.

The second portion 72 extends forward from a middle portion of the first portion 71 in the up-down direction of the machine body. The second portion 72 is oriented horizontally.

The third portion 73 extends substantially downward from a front end portion of the second portion 72, and is connected to an upper portion of the radiator frame 57. The third portion 73 is oriented obliquely in a lower front direction. The third portion 73 includes a back end portion connected to the front end portion of the second portion 72, and includes a front end portion connected to the upper portion of the radiator frame 57.

The support 7, in other words, includes (i) a first portion 71 extending upward from an upper portion of the radiator frame 57, (ii) a second portion 72 extending forward from a middle portion of the first portion 71 in the up-down direction of the machine body, and (iii) a third portion 73 extending substantially downward from a front end portion of the second portion 72 and connected to an upper portion of the radiator frame 57.

The first hose 6a extends through an area AR defined by the first portion 71, the second portion 72, and the third portion 73.

The description below deals with the first portion 71 in detail. The first portion 71 includes a support stay 71a and a vertical fixed portion 71b. The support stay 71a is in the shape of an elongated plate, and extends in the up-down direction of the machine body along the left side plate 57a. The support stay 71a includes a lower end portion bolted to a back end portion of an upper end portion of the left side plate 57a.

The vertical fixed portion 71b is in the shape of an elongated plate, and extends in the up-down direction of the machine body. The vertical fixed portion 71b has a dimension smaller than the support stay 71a in the up-down direction of the machine body.

The vertical fixed portion 71b is perpendicular to the support stay 71a, and is fixed to its left surface. The vertical fixed portion 71b, the second portion 72, and the third portion 73 are integral with one another.

The above-mentioned area AR is defined by the support stay 71a, the second portion 72, and the third portion 73.

As illustrated in FIGS. 2 to 5, the tractor A includes a horizontally oriented support plate SP at a front portion thereof. The support plate SP supports the radiator 15, the cooling fan 17, the auxiliary battery 18, the voltage converter 19, the radiator frame 57, and the cooler CL.

As illustrated in FIGS. 1 and 2, the tractor A includes a hydraulic pump 60. The hydraulic pump 60 supplies operating fluid to an operating mechanism for operating the tiller device 13. The hydraulic pump 60 controls the supply of operating fluid to operate the tiller device 13.

Specifically, the tractor A includes a lifting/lowering mechanism 36 as an operating mechanism for a work device. The hydraulic pump 60 supplies operating fluid to the lifting/lowering mechanism 36 to operate the lifting/lowering mechanism 36, which then lifts and lowers the tiller device 13. The tiller device 13 includes a tiller section 13a with a drive section connected to a PTO shaft 37 of the tractor A. The tiller device 13 performs tillage work with use of power from the PTO shaft 37.

Figure 6:
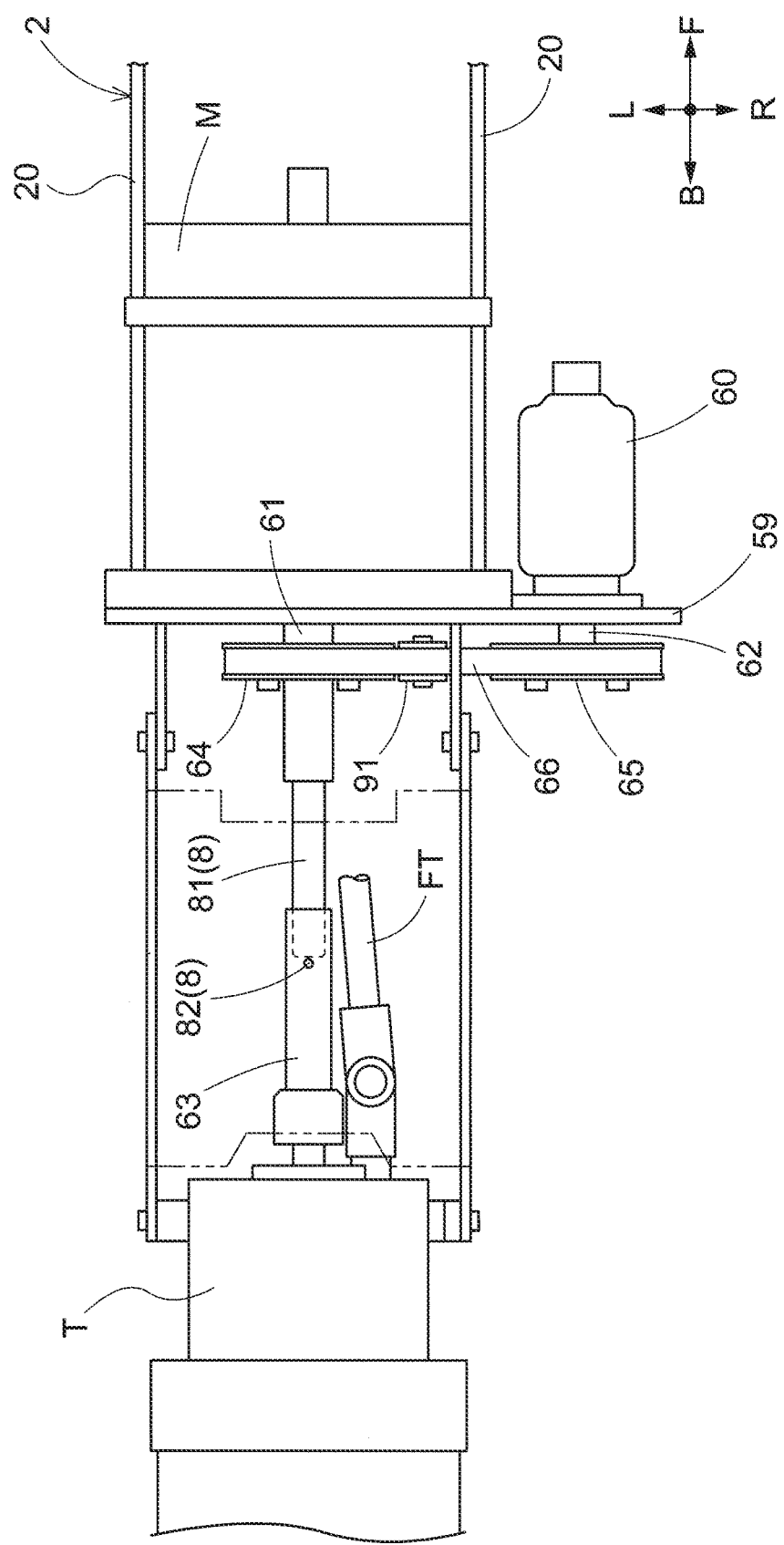
FIG. 6 is a plan view of a motor and other elements.

As illustrated in FIGS. 2, 4, and 6, the hydraulic pump 60 is next to the motor M.

As illustrated in FIG. 2, the motor M is held in place by a front portion support frame 50 and a back portion support frame 59.

The front portion support frame 50 extends from one of the left and right main frames 20 to the other, and is fixed to respective lower portions of the left and right main frames 20. The front portion support frame 50 is under a front portion of the motor M and supports it.

The back portion support frame 59 extends beyond the left and right main frames 20. The back portion support frame 59 is in contact with a back end portion of the motor M and holds a back portion of the motor M in place.

As illustrated in FIGS. 2 and 6, the hydraulic pump 60 is in front of and attached to the back portion support frame 59. The hydraulic pump 60 is held in place by the back portion support frame 59.

In other words, the motor M and the hydraulic pump 60 are both held in place by the same back portion support frame 59.

As illustrated in FIG. 6, the motor M includes a motor output shaft 61 as its output shaft. The motor output shaft 61 is provided with a first rotor 64 configured to rotate integrally with the motor output shaft 61.

The tractor A, in other words, includes a first rotor 64 attached to the motor output shaft 61 and configured to rotate integrally with the motor output shaft 61.

The hydraulic pump 60 includes a pump input shaft 62 as its input shaft. The pump input shaft 62 is provided with a second rotor 65 configured to rotate integrally with the pump input shaft 62.

The tractor A, in other words, includes a second rotor 65 attached to the pump input shaft 62 as an input shaft of the hydraulic pump 60 and configured to rotate integrally with the pump input shaft 62.

The tractor A also includes an endless rotary body 66 wound around the first rotor 64 and the second rotor 65.

The tractor A, in other words, includes an endless rotary body 66 windable around the first rotor 64 and the second rotor 65.

The endless rotary body 66 for the present preferred embodiment is a belt. Preferred embodiments of the present invention are, however, not limited to such an arrangement. The endless rotary body 66 is not necessarily a belt, and may be a chain, for example.

The above configuration allows the motor M to transmit its driving force to the hydraulic pump 60 via the motor output shaft 61, the first rotor 64, the endless rotary body 66, the second rotor 65, and the pump input shaft 62. This drives the hydraulic pump 60.

The tractor A, in other words, includes a hydraulic pump 60 drivable by the motor M to supply operating fluid to the tiller device 13.

The transmission device T includes a transmission input shaft 63 as its input shaft. The transmission input shaft 63 is coupled to the motor output shaft 61 with a coupling section 8. This allows the transmission input shaft 63 to rotate integrally with the motor output shaft 61.

Figure 7:
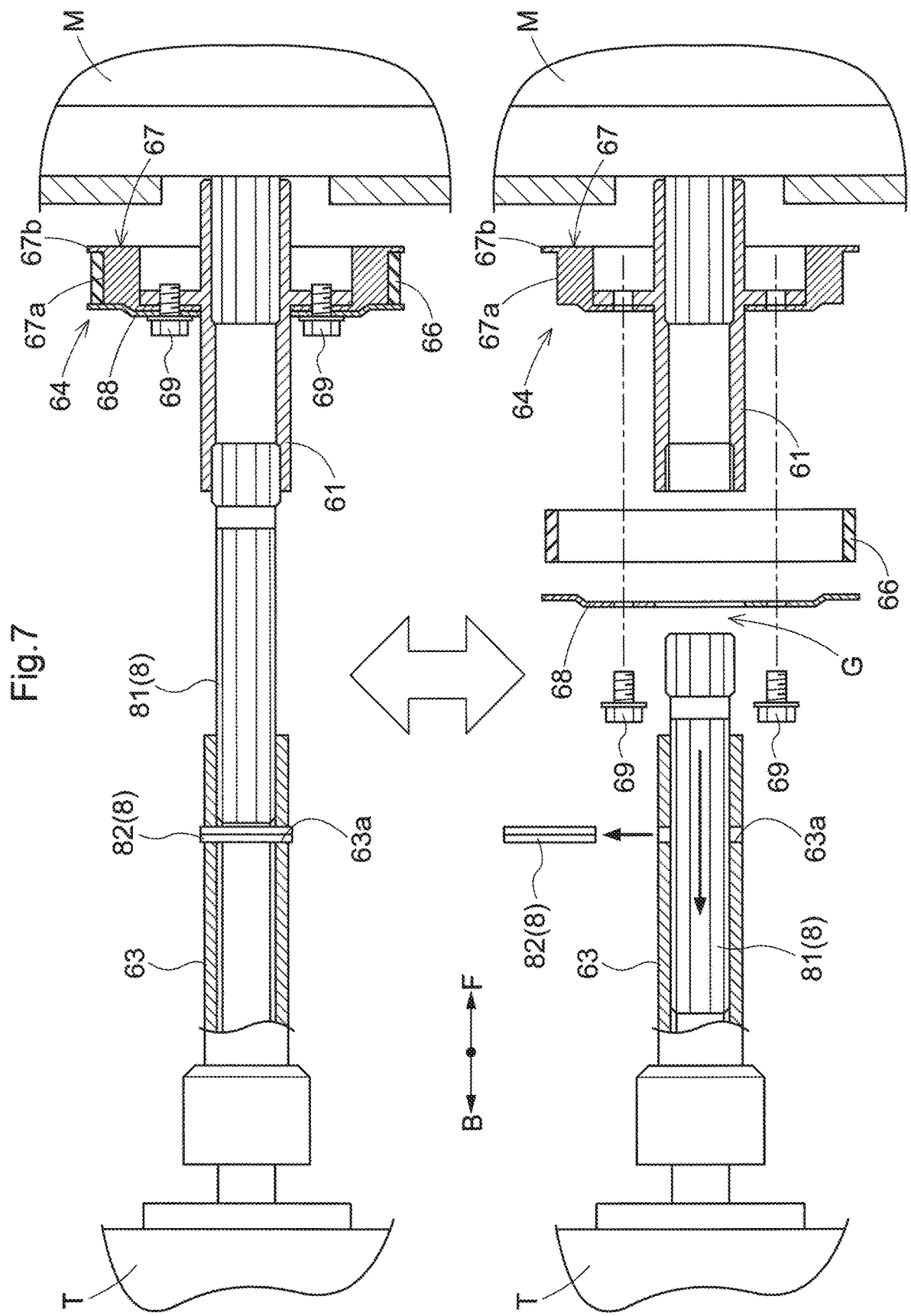
FIG. 7 provides views of a coupling section and other elements.

Specifically, as illustrated in FIG. 7, the motor output shaft 61 and the transmission input shaft 63 each have a cylinder shape extending in the front-back direction of the machine body. The coupling section 8 includes a coupling shaft 81 and a pin 82.

The coupling shaft 81 extends in the front-back direction of the machine body. The coupling shaft 81 includes a front end portion inserted in the motor output shaft 61 and in spline engagement therewith. The coupling shaft 81 includes a back end portion inserted in the transmission input shaft 63 and in spline engagement therewith.

The transmission input shaft 63 includes a pin hole 63a, in which the pin 82 is insertable. The pin 82 is, when inserted, behind the coupling shaft 81 to prevent it from sliding backward.

In the state illustrated on the left side of FIG. 7, the transmission input shaft 63 and the motor output shaft 61 are incapable of rotation relative to each other.

The tractor A, in other words, includes a coupling section 8 configured to couple the transmission input shaft 63 and the motor output shaft 61 to each other in such a manner that the transmission input shaft 63 and the motor output shaft 61 are incapable of rotation relative to each other.

As illustrated in FIG. 7, the coupling section 8 is switchable between a coupling state and a non-coupling state. In the coupling state, the coupling section 8 couples the transmission input shaft 63 and the motor output shaft 61 to each other. In the non-coupling state, the coupling section 8 does not couple the transmission input shaft 63 and the motor output shaft 61 to each other.

FIG. 7 illustrates on the left side the coupling section 8 in the coupling state. In this state, the transmission input shaft 63 and the motor output shaft 61 are incapable of rotation relative to each other as described above. The transmission input shaft 63 thus rotates integrally with the motor output shaft 61.

In other words, while the coupling section 8 is in the coupling state, the transmission input shaft 63 rotates integrally with the motor output shaft 61.

With the pin 82 has been pulled out of the pin hole 63a, and the coupling shaft 81 has been slid backward, the coupling section 8 is in the state illustrated on the right side of FIG. 7, that is, in the non-coupling state.

In this state, the coupling shaft 81 is spaced apart from the motor output shaft 61, with a gap G between the front end of the coupling shaft 81 and the back end of the motor output shaft 61.

The gap G is between the front end of the transmission input shaft 63 and the back end of the motor output shaft 61, and is larger than the width of the endless rotary body 66. This allows the endless rotary body 66 to pass through the gap G in a case where the endless rotary body 66 has been removed from the first rotor 64 or the second rotor 65.

In other words, while the coupling section 8 is in the non-coupling state, the front end of the transmission input shaft 63 and the back end of the motor output shaft 61 define a gap G that allows the endless rotary body 66 to pass therethrough in a case where the endless rotary body 66 has been removed.

As illustrated in FIG. 7, the first rotor 64 includes a first segment 67 and a second segment 68. The first segment 67 is forward of the second segment 68. As illustrated on the left side of FIG. 7, the second segment 68 includes a front surface in contact with the back surface of the first segment 67.

The first segment 67 includes a wind-around section 67a and a flange section 67b. The wind-around section 67a allows the endless rotary body 66 to be wound therearound. The flange section 67b protrudes radially at a front end portion of the first segment 67.

The second segment 68 is in the shape of a disk. The second segment 68 is fixed to the back end of the wind-around section 67a with use of a plurality of fixation bolts 69. The second segment 68 has an outer diameter equal to that of the flange section 67b.

With this configuration, removing the plurality of fixation bolts 69 allows the second segment 68 to be removed as illustrated on the right side of FIG. 7. With the second segment 68 removed, moving the endless rotary body 66 backward allows the endless rotary body 66 to be removed from the first rotor 64 easily.

With the coupling section 8 in the non-coupling state, an operator can remove the endless rotary body 66 from the first rotor 64 and pass the endless rotary body 66 through the gap G to remove the endless rotary body 66 from the tractor A easily.

To attach the endless rotary body 66 to the tractor A, an operator can pass the endless rotary body 66 through the gap G, wind the endless rotary body 66 around the wind-around section 67a, and then fix the second segment 68 as illustrated on the left side of FIG. 7. The operator can easily attach the endless rotary body 66 to the tractor A as such.

Figure 8:
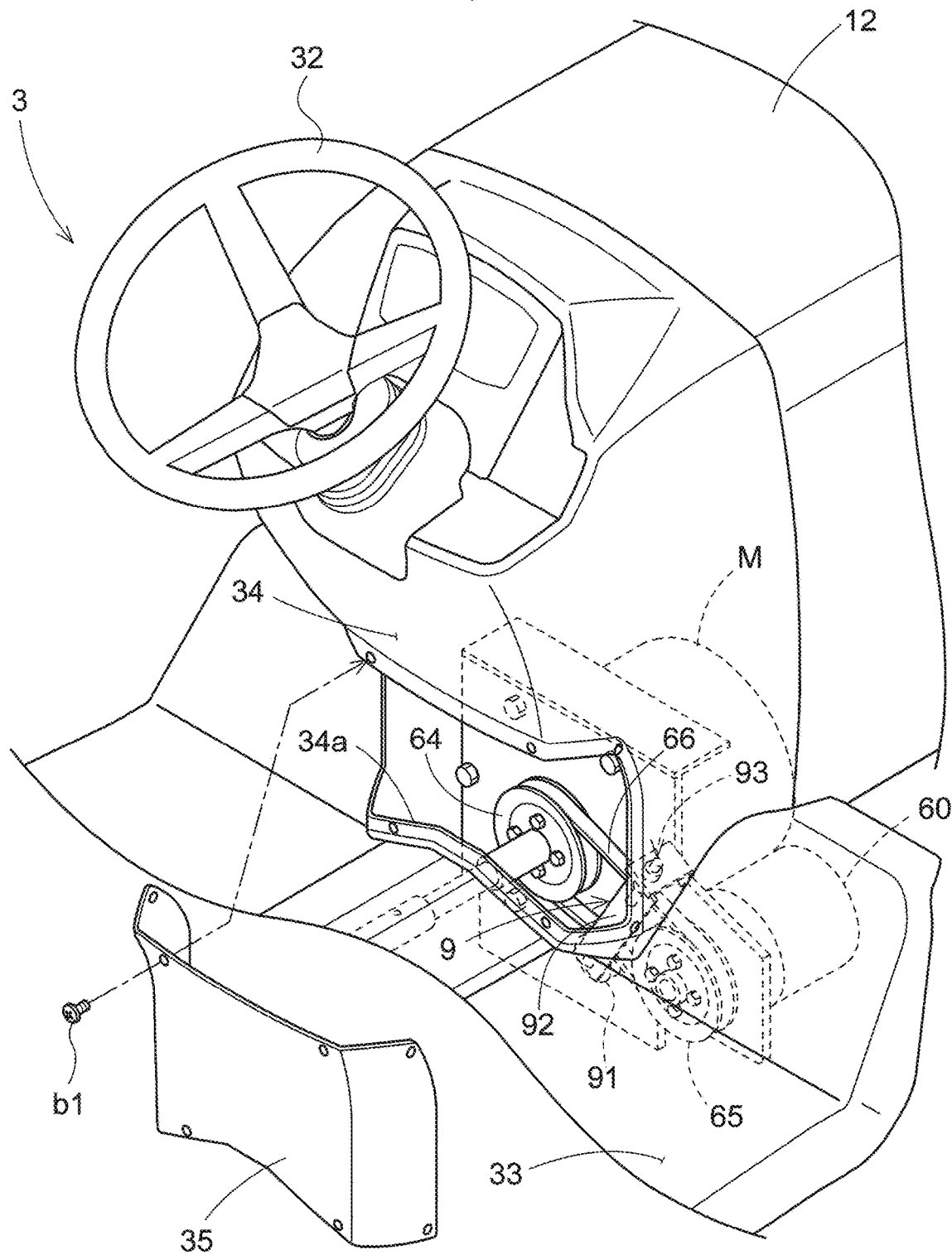
FIG. 8 is a view of an opening and elements therearound.

As illustrated in FIG. 8, the tractor A includes a tension adjusting mechanism 9. The tension adjusting mechanism 9 includes a tension ring 91, a long linkage member 92, and an adjuster 93.

The tension ring 91 is in contact with the endless rotary body 66, and applies tension thereto. The tension ring 91 is supported by the body frame 2 with the linkage member 92 therebetween.

The adjuster 93 is manually operable. Manually operating the adjuster 93 moves the linkage member 92 in its longitudinal direction. The movement of the linkage member 92 causes the tension ring 91 to also move in the longitudinal direction of the linkage member 92. This changes the tension of the endless rotary body 66.

With this configuration, the tension adjusting mechanism 9 is manually operable to adjust the tension of the endless rotary body 66.

The tractor A, in other words, includes a tension adjusting mechanism 9 manually operable to adjust the tension of the endless rotary body 66.

As illustrated in FIGS. 1, 2, and 8, the driver section 3 includes a wall 34 and an opening cover member 35.

The wall 34 defines and functions as a partition that separates the driver's seat 31 from the endless rotary body 66 and the tension adjusting mechanism 9. The wall 34 includes an opening 34a in the vicinity of the tension adjusting mechanism 9. The opening 34a is also in the vicinity of the front end of the floor 33.

The opening cover member 35 is detachably attached to the wall 34 to close the opening 34a. Detaching the opening cover member 35 exposes the opening 34a. Attaching the opening cover member 35 closes the opening 34a.

Specifically, the opening cover member 35 is attached to the wall 34 with use of a bolt(s) b1. Removing the bolt b1 allows the opening cover member 35 to be detached. While FIG. 8 shows only one bolt b1, the number of bolts b1 may be any number of one or more.

The driver section 3, in other words, includes a wall 34 as a partition that separates the driver's seat 31 from the endless rotary body 66 and the tension adjusting mechanism 9. The driver section 3 also includes an opening cover member 35 capable of exposing and closing the opening 34a.

Preferred embodiments of the present invention are, however, not limited to such an arrangement. The opening cover member 35 may be attachable to the wall 34 without use of a bolt b1. For instance, a preferred embodiment of the present invention may be arranged such that the opening cover member 35 has a protrusion, whereas the wall 34 has a depression and that fitting the protrusion into the depression causes the opening cover member 35 to be attached to the wall 34.

An operator can remove the opening cover member 35 to easily reach the adjuster 93 through the opening 34a.

With the configuration described above, the voltage converter 19 and the radiator 15 are laterally next to each other in a plan view. This allows cooling air to be supplied to the voltage converter 19 and the radiator 15 similarly as the tractor A travels. The above configuration, in other words, prevents cooling air toward one of the voltage converter 19 and the radiator 15 from being blocked by the other.

The above configuration makes it possible to effectively cool both the voltage converter 19 and the radiator 15.

In addition, with the above configuration, the voltage converter 19 and the radiator 15 are both forward of the travel battery 4. This allows the voltage converter 19 and the radiator 15 to be maintained at the same time, making the maintenance work easy.

The configuration described above therefore allows production of a tractor A including a voltage converter 19 and a radiator 15 both of which can be cooled effectively and maintained easily.

The preferred embodiments described above are mere examples. Preferred embodiments of the present invention are not limited thereto, and may be altered as appropriate.

Alternative Preferred Embodiments

The tractor A may include a single first support frame 51 or three or more first support frames 51.

The tractor A may include a single second support frame 52 or three or more second support frames 52.

The tractor A may have a single ventilation opening K or three or more ventilation openings K.

The cover member 12 may include a single outlet section 12*b* or three or more outlet sections 12*b*.

The cover member 12 may have a single vent hole that doubles as an inlet section 12*a* and an outlet section 12*b*.

The second portion 72 is not necessarily oriented horizontally. The second portion 72 may be, for instance, oriented obliquely in an upper front direction or a lower front direction.

The third portion 73 is not necessarily oriented in a lower front direction. The third portion 73 may, for instance, be oriented vertically or extend from a front end portion of the second portion 72 in a lower back direction.

The coupling shaft 81 may be slidable forward. In this case, the back end of the coupling shaft 81 and the front end of the transmission input shaft 63 may define a gap G.

The coupling shaft 81 may be slidable backward such that its front end is moved backward of the front end of the transmission input shaft 63. In this case, the back end of the motor output shaft 61 and the front end of the transmission input shaft 63 may define a gap G.

The second segment 68 may be fixed to the back end of the wind-around section 67*a* with use of a single fixation bolt 69.

The second segment 68 may be fixed to the back end of the wind-around section 67*a* without use of fixation bolts 69. A preferred embodiment of the present invention may be arranged, for instance, such that the first segment 67 has a protrusion, whereas the second segment 68 has a depression and that fitting the protrusion into the depression causes the second segment 68 to be fixed to the back end of the wind-around section 67*a*.

The second segment 68 may have an outer diameter different from that of the flange section 67*b*.

The motor M is not necessarily in contact with the ventilation space S.

The tractor A may be a hybrid tractor including an engine as well.

The wind guide plate 56*a* may be absent.

The plate-shaped partition member 56 may be absent.

The motor M and the travel battery 4 do not necessarily define a second space S2 therebetween.

The second space S2 may not be part of the ventilation space S. The second space S2 may, in other words, be separated from the ventilation space S.

The inverter 14 and the travel battery 4 do not necessarily define a first space S1 therebetween.

The first space S1 may not be part of the ventilation space S. The first space S1 may, in other words, be separated from the ventilation space S.

The cover member 12 may be absent.

The cover member 12 may be incapable of accommodating at least one or even all of the travel battery 4, the reserve tank 5, the first hose 6*a*, the radiator 15, the cooling fan 17, the auxiliary battery 18, the voltage converter 19, and the radiator frame 57.

The outlet sections 12*b* may be absent.

The inlet section 12*a* may be absent.

The outlet sections 12*b* are not necessarily lateral to the travel battery 4. The outlet sections 12*b* may be backward of the travel battery 4, for instance.

The first plate-shaped member 54 may be absent.

The second plate-shaped member 55 may be absent.

The first plate-shaped member 54 is not necessarily oriented horizontally. The first plate-shaped member 54 may, for instance, be inclined in a lower front direction or a lower back direction.

The second plate-shaped member 55 is not necessarily oriented horizontally. The second plate-shaped member 55 may, for instance, be inclined in a lower front direction or a lower back direction.

The ventilation space S does not necessarily communicate with the ventilation openings K.

The ventilation openings K may be absent.

The first support frames 51 do not necessarily stand on the body frame 2.

The second support frames 52 do not necessarily stand on the body frame 2.

The first support frames 51 may be absent.

The second support frames 52 may be absent.

The first hose 6*a* does not necessarily extend through an area AR defined by the first portion 71, the second portion 72, and the third portion 73. The first hose 6*a* may, for instance, extend through an area forward of the third portion 73.

The support 7 does not necessarily include a second portion 72 or a third portion 73.

The cover support 58 may be absent.

The support 7 may be absent.

The tractor A may not include at least one or even all of the first hose 6*a*, the second hose 6*b*, the water supply section 6*c*, and the third hose 6*d*.

The voltage converter 19 may be oriented to have a longitudinal direction extending in the front-back or left-right direction of the machine body.

The voltage converter 19 is not necessarily attached to the radiator frame 57.

The radiator frame 57 may be absent.

The reserve tank 5 and the auxiliary battery 18 are not necessarily arranged in the up-down direction of the machine body, and may be arranged in, for example, the left-right direction of the machine body.

The radiator 15, the voltage converter 19, and the reserve tank 5 are not necessarily laterally next to one another in a plan view. For instance, the reserve tank 5 may be over the voltage converter 19.

The radiator 15, the voltage converter 19, and the auxiliary battery 18 are not necessarily laterally next to one another in a plan view. For instance, the auxiliary battery 18 may be over the voltage converter 19.

The cooling fan 17 may blow cooling air in a direction other than backward. The cooling fan 17 may blow cooling air forward, for example.

The cooling fan 17 may be above or below the inverter 14.

The bottom plate 53a may be absent.

The inverter support 21 may be rightward of the left end of the left main frame 20.

The inverter support 21 may be leftward of the right end of the right main frame 20.

The inverter support 21 may be absent. In this case, the inverter 14 is supported directly by the left main frame 20 and the right main frame 20.

The inverter 14 may be rightward of the left end of the left main frame 20.

The inverter 14 may be leftward of the right end of the right main frame 20.

The body frame 2 does not necessarily include left and right main frames 20. The body frame 2 may include, for example, a single frame member.

The water pump 16 is not necessarily positioned forward of the motor M, and may be backward of the motor M, for instance.

The water pump 16 may be above the inverter 14.

The motor M is not necessarily between the left and right main frames 20, and may be above the left and right main frames 20, for instance.

The hydraulic pump 60 is not necessarily supported by the back portion support frame 59. In other words, the motor M and the hydraulic pump 60 are not necessarily both held in place by the same back portion support frame 59.

The opening cover member 35 may be incapable of exposing and closing the opening 34a. The opening cover member 35 may be unremovable, for instance.

The wall 34 does not necessarily have an opening 34a.

The wall 34 may be absent.

The opening cover member 35 may be absent.

The tension adjusting mechanism 9 may be absent.

The endless rotary body 66 may, after being removed, be incapable of passing through the gap G.

The coupling section 8 is not necessarily switchable from the coupling state to the non-coupling state.

The coupling section 8 may be absent.

The first rotor 64 and the second rotor 65 may both be gears that mesh with each other. In this case, the endless rotary body 66 may be absent.

The transmission input shaft 63 does not necessarily rotate integrally with the motor output shaft 61. For instance, the transmission input shaft 63 and the motor output shaft 61 may be interlocked with each other with use of a plurality of gears.

The transmission device T is not necessarily backward of the motor M, and may be forward of the motor M, for instance.

The tiller device 13 may be replaced with any of (i) various devices such as a fertilizer distributing device, an agent sparging device, a disseminating device, and a harvesting device and (ii) work devices such as a loader and a shovel.

The wind guide plate 56a is not necessarily oriented vertically, and may be, for instance, inclined in a lower front direction or a lower back direction.

The motor M is not necessarily located below the travel battery 4, and may be located above the travel battery 4, for instance.

The inverter 14 is not necessarily located below the travel battery 4, and may be above the travel battery 4, for instance.

The cooling fan 17 may be above or below the travel battery 4 or the ventilation space S.

The ventilation space S may be absent.

The cooling fan 17 is not necessarily in front of the travel battery 4, and may be backward of the travel battery 4, for instance.

The cooling fan 17 may supply cooling air that does not cool the travel battery 4.

The travel battery 4 may coincide with or be below the body frame 2 in a side view.

The motor M and the inverter 14 may be next to each other in the left-right direction of the machine body or be arranged in the up-down direction of the machine body.

The transmission device T may be positioned forward of the travel battery 4.

The hydraulic pump 60 may be relatively far from the motor M.

The hydraulic pump 60 may be drivable by a power source other than the motor M.

Preferred embodiments of the present invention are applicable to not only tractors but also various electric work vehicles such as combines, rice transplanters, and construction machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric work vehicle, comprising:
a travel battery;
an auxiliary battery;
a motor drivable on electric power supplied by the travel battery;
a travel device drivable by the motor;
a voltage converter configured to step down a voltage of electric power from the travel battery and supply the electric power to the auxiliary battery; and
a radiator,
a body frame extending in the front-back direction of a machine body,
wherein a cover member for accommodating the voltage converter, the radiator, and the travel battery is provided at a front end portion of the machine body,
an inlet section for letting outside air into the cover member is provided at a front end of the cover member,
the travel battery is supported by the body frame with a support frame or a battery support in-between, and
the auxiliary battery is arranged at a position between the travel battery and the inlet section in a plan view to face the inlet section.

2. The electric work vehicle according to claim 1, wherein an outlet section which is for letting air out of the cover member is provided on at least one of a left side portion and a right side portion of the cover member.

3. The electric work vehicle according to claim 1, wherein the voltage converter is positioned forward of the travel battery, and
the radiator is positioned forward of the travel battery.

4. The electric work vehicle according to claim 1, wherein the voltage converter and the radiator are laterally next to each other in a plan view.

5. The electric work vehicle according to claim 1, wherein the radiator, the voltage converter, and the auxiliary battery are laterally next to one another in a plan view.

6. The electric work vehicle according to claim 1, comprising:
a reserve tank for the radiator,
wherein the radiator, the voltage converter, and the reserve tank are laterally next to one another in a plan view.

7. The electric work vehicle according to claim 6, wherein the reserve tank and the auxiliary battery are arranged in an up-down direction of the machine body.

8. The electric work vehicle according to claim 1, further comprising:
a radiator frame having a shape of an angular arch surrounding the radiator and holding the radiator in place,
wherein the voltage converter is attached to the radiator frame and oriented to have a longitudinal direction extending in an up-down direction of the machine body.

9. An electric work vehicle, comprising:
a travel battery;
an auxiliary battery;
a motor drivable on electric power supplied by the travel battery;
a travel device drivable by the motor;
a voltage converter configured to step down a voltage of electric power from the travel battery and supply the electric power to the auxiliary battery; and
a radiator,
a body frame extending in the front-back direction of a machine body,
wherein a cover member for accommodating the voltage converter, the radiator, and the travel battery is provided at a front end portion of the machine body,
an inlet section for letting outside air into the cover member is provided at a front end of the cover member,
the travel battery is supported by the body frame with a support frame or a battery support in-between,
the electric work vehicle further comprises a radiator frame having a shape of an angular arch surrounding the radiator and holding the radiator in place,
the voltage converter is attached to the radiator frame and oriented to have a longitudinal direction extending in an up-down direction of the machine body,
the electric work vehicle further comprises a cooling water hose connected to the radiator;
wherein the cover member is for being opened and closed and for accommodating the voltage converter, the radiator, the cooling water hose, and the radiator frame;
the electric work vehicle further comprises:
a support extending upward from an upper portion of the radiator frame; and
a cover support coupled to an upper end portion of the support and for supporting the cover member in an open state;
wherein the support includes:
a first portion extending upward from the upper portion of the radiator frame;
a second portion extending forward from a middle portion of the first portion in the up-down direction of the machine body; and
a third portion extending downward from a front end portion of the second portion and connected to the upper portion of the radiator frame, and
the cooling water hose extends through an area defined by the first portion, the second portion, and the third portion.

* * * * *